(12) United States Patent
Yu et al.

(10) Patent No.: US 12,703,827 B2
(45) Date of Patent: Aug. 11, 2026

(54) COMPOSITION WITH MIXED $C_8$-$C_{18}$ ALCOHOLS AND SURFACTANTS THEREOF

(71) Applicant: Dow Global Technologies LLC, Midland, MI (US)

(72) Inventors: Wanglin Yu, Lake Jackson, TX (US); Michael A. Brammer, Freeport, TX (US); Sally Demaio-Turner, Lake Jackson, TX (US); Sung-Yu Ku, Lake Jackson, TX (US); Bruce D. Hook, Lake Jackson, TX (US); Haifeng Shi, Lake Jackson, TX (US); Jin Yang, Freeport, TX (US); Yujun Liu, Lake Jackson, TX (US); Jeff Johnson, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 918 days.

(21) Appl. No.: 17/999,963

(22) PCT Filed: May 27, 2021

(86) PCT No.: PCT/US2021/034439
§ 371 (c)(1),
(2) Date: Nov. 28, 2022

(87) PCT Pub. No.: WO2021/242971
PCT Pub. Date: Dec. 2, 2021

(65) Prior Publication Data

US 2023/0227727 A1 Jul. 20, 2023

Related U.S. Application Data

(60) Provisional application No. 63/032,303, filed on May 29, 2020.

(51) Int. Cl.
*C07C 31/125* (2006.01)
*C07C 45/50* (2006.01)
(Continued)

(52) U.S. Cl.
CPC .................................... *C09K 23/42* (2022.01)

(58) Field of Classification Search
CPC ..... C11D 3/2003; C11D 3/2017; C11D 3/202; C09K 23/42; C07C 31/125; C07C 45/50; C07C 47/02
See application file for complete search history.

(56) References Cited

U.S. PATENT DOCUMENTS 4,426,542 A 1/1984 Barker et al.
4,598,162 A * 7/1986 Forster .................... C07C 45/50 568/850
(Continued)

FOREIGN PATENT DOCUMENTS

CN 101565353 A 10/2009
EP 0115083 A1 8/1984
(Continued)

OTHER PUBLICATIONS

Krupcik, J. et al., Analysis of Hydroformylation Products of Higher n-Alkenes by Capillary Gas Chromatography, Collection Czechoslovak Chem. Commun., vol. 50, 1985, pp. 1808-1818.
(Continued)

*Primary Examiner* — Brian P Mruk
(74) *Attorney, Agent, or Firm* — Boyle Fredrickson S.C.

(57) ABSTRACT

The present disclosure provides a composition. In an embodiment, the composition includes 2-heptylundecanol; a member selected from the group consisting of 2-ethyhexanol and 2-propylheptanol; and a mixture of an alcohol (1) and an alcohol (2), alcohol (1) having the Structure (1) wherein $R_1$ is selected from the group consisting of an ethyl group and
(Continued)

a propyl group, $R_2$ and $R_3$ each independently is selected from the group consisting of hydrogen and an alkyl group, with the proviso that the total number of carbon atoms of $R_1$ and $R_2$ is 7, and alcohol (2) having the Structure (2) wherein $R_4$ is selected from the group consisting of an n-propyl group, an isopropyl group, an n-butyl group, and an isobutyl group.

3 Claims, 3 Drawing Sheets

(51) Int. Cl.
*C07C 47/02* (2006.01)
*C09K 23/42* (2022.01)

(56) References Cited

U.S. PATENT DOCUMENTS 5,300,154 A 4/1994 Ferber et al.
5,464,557 A 11/1995 Ferber et al.
5,741,944 A 4/1998 Bryant et al.
6,093,856 A 7/2000 Cripe et al.
6,566,565 B1 5/2003 Murray et al.
6,906,230 B1 6/2005 Maas et al.
7,183,446 B2 2/2007 Zeller et al.
8,334,323 B2 12/2012 Varineau et al.
10,196,336 B2 2/2019 Elowe et al.
2002/0028974 A1 3/2002 Scholz et al.
2002/0133047 A1* 9/2002 Bahrmann ............. C07C 45/74 568/840
2003/0176745 A1 9/2003 Maas et al.
2005/0004404 A1 1/2005 Muller et al.
2005/0107628 A1 5/2005 Roper et al.
2005/0170991 A1 8/2005 Ruland et al.
2010/0323888 A1 12/2010 Bardinelli et al.
2011/0260101 A1 10/2011 Rittig et al.
2012/0035386 A1 2/2012 Nguyen
2013/0274511 A1 10/2013 Foley et al.

FOREIGN PATENT DOCUMENTS

JP S62-223299 A 10/1987
JP H10-251181 A 9/1998
JP 5798961 B2 10/2015
WO 2008/068307 A2 6/2008
WO 2013/142206 A1 9/2013

OTHER PUBLICATIONS

Roberts, David W., Use of octanol/water partition coefficients as hydrophobicity parameters in surfactant science, Abstract, Jan. 23, 2002.

* cited by examiner

COMPOSITION WITH MIXED $C_8$-$C_{18}$ ALCOHOLS AND SURFACTANTS THEREOF

BACKGROUND

Reclamation of the purged hydrocarbon species is one of the biggest challenges facing large-scale polyolefin production. For example, conversion of the octene comonomer in ethylene/octene copolymer polymerization production is generally very low, for example between 10 and 20%. This means that 80-90% of the octene can pass through the reactor without being converted to polymer.

Hence, the art recognizes the on-going need for ways to utilize purge stream hydrocarbon species, and octene/alkane industrial purge stream in particular, that avoids mere disposal of same. A need further exists for utilizing octene monomer that is present in the purge stream. In addition, there is a need to develop cost-effective lightly branched detergent range alcohols to produce readily biodegradable and high performance surfactant materials.

SUMMARY

Applicant discovered that hydroformylation of an octene/alkane industrial purge stream generates a mixture of $C_9$ aldehydes, unreacted $C_8$ olefins, and hydrocarbon solvent. This hydroformylation product can then be cross-aldol reacted with butyraldehyde and/or valeraldehyde to produce $C_8$-$C_{18}$ aldehydes. With subsequent hydrogenation, these $C_8$-$C_{18}$ aldehydes can then be used to produce $C_8$-$C_{18}$ alcohols. $C_8$-$C_{18}$ alcohols are high-demand starting materials for end applications such as surfactants, for example.

The present disclosure provides a composition. In an embodiment, the composition includes 2-heptylundecanol;

a member selected from the group consisting of 2-ethyhexanol and 2-propylheptanol; and a mixture of an alcohol (1) and an alcohol (2)

alcohol (1) having the Structure (1)

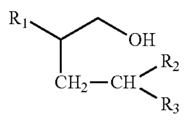

wherein $R_1$ is selected from the group consisting of an ethyl group and a propyl group, $R_2$ and $R_3$ each independently is selected from the group consisting of hydrogen and an alkyl group, with the proviso that the total number of carbon atoms of $R_1$ and $R_2$ is 7, and alcohol (2) having the Structure (2)

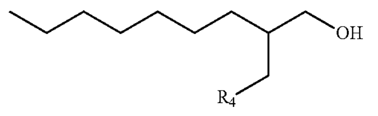

wherein $R_4$ is selected from the group consisting of an n-propyl group, an isopropyl group, an n-butyl group, and an isobutyl group.

DEFINITIONS

Figure 1:
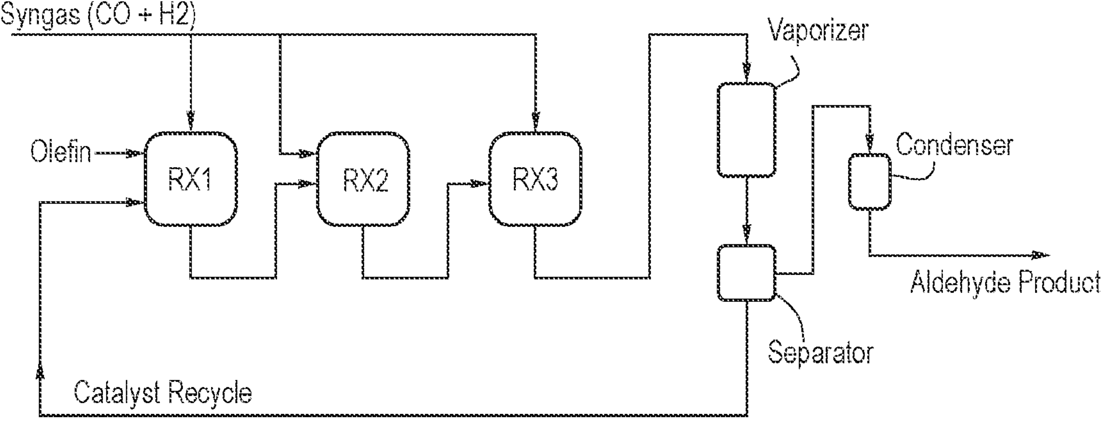
FIG. 1 is a schematic representation of a hydroformylation reactor system for providing hydroformylation conditions, in accordance with an embodiment of the present disclosure.
Figure 2:
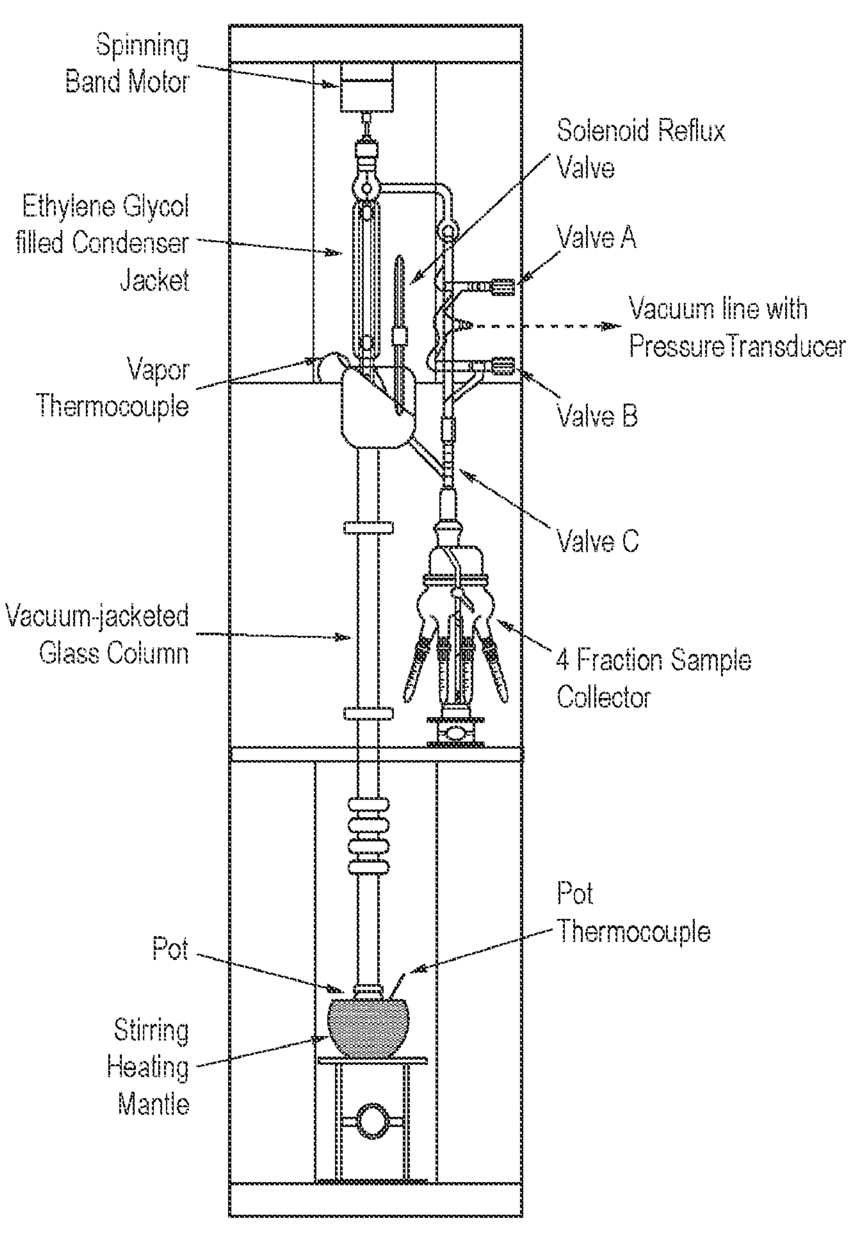
FIG. 2 is a schematic representation of a spinning band distillation column (SBDC), in accordance with an embodiment of the present disclosure.
Figure 3:
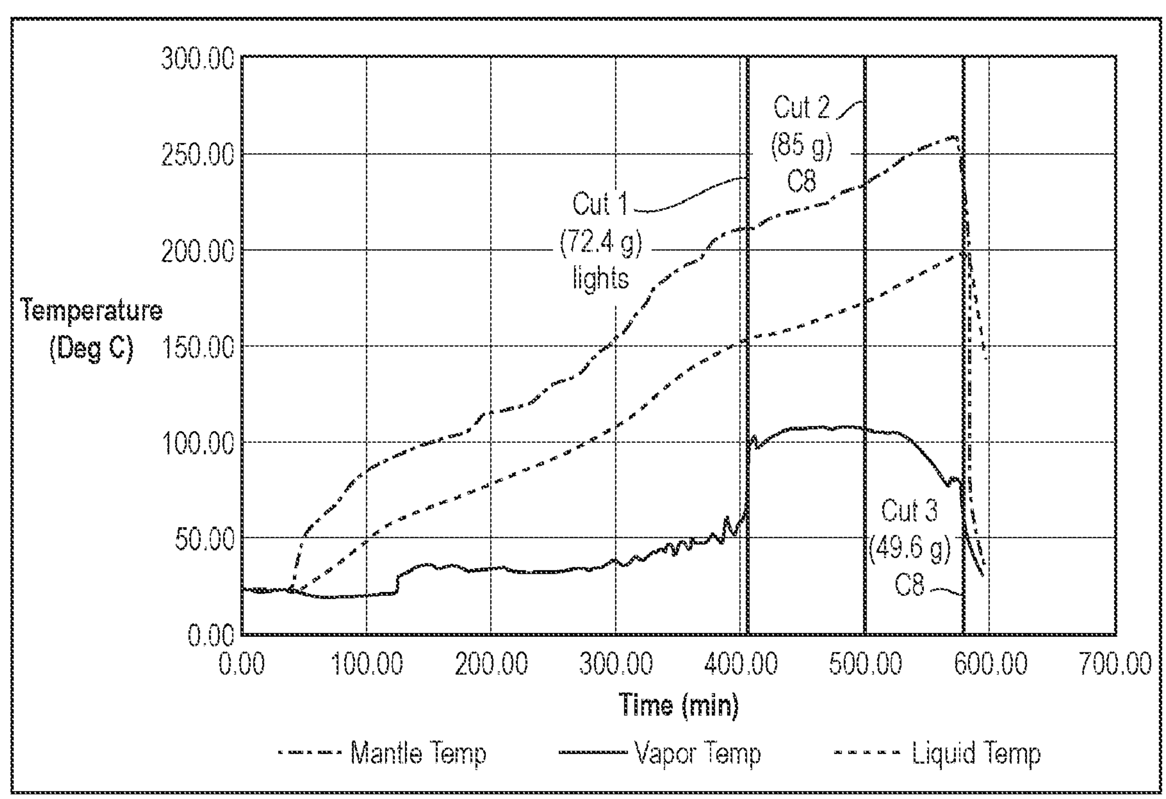
FIG. 3 is a temperature-time graph of overhead distillate separation in accordance with an embodiment of the present disclosure.

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges of 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "alcohol" is a compound having a hydroxyl group (—OH) attached to a hydrocarbon radical.

An "aldehyde" is a compound having a carbonyl functional group (C═O) attached to one hydrocarbon radical and a hydrogen atom.

An "alkene" is a hydrocarbon containing a carbon-carbon double bond.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "enal" is an aldehyde compound that contains a carbon-carbon double bond. Enals may be formed by aldol (or cross-aldol) condensation of aldehydes followed by dehydration of the resulting intermediate compound. A non-limiting example of an enal is 2-ethylhexenal, which results from the self-condensation of $C_4$ aldehyde as shown below:

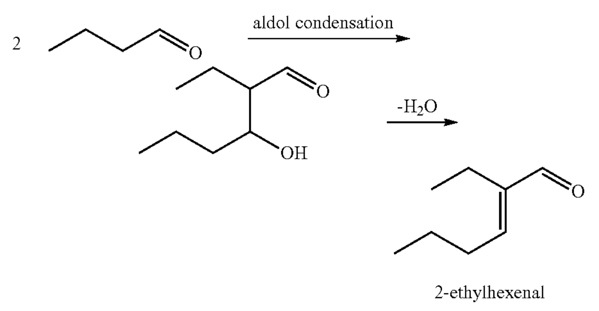

2-ethylhexenal

An "enol" is an alcohol which contains a carbon-carbon double bond. An enol may be formed by partial hydrogenation of an enal.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably.

A "hydrocarbon" is a compound containing only hydrogen atoms and carbon atoms. A "hydrocarbonyl" (or "hydrocarbonyl group") is a hydrocarbon having a valence (typically univalent). The term "alkyl group" is interchangeably referred to as a "hydrocarbonyl group."

The term "1-octene," as used herein, is an unsaturated hydrocarbon α-olefin having the molecular formula $C_8H_{16}$ and the unsaturation is at the alpha position. 1-octene has the molecular Structure (A) as shown below.

Structure (A)

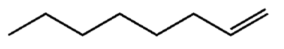

The term "isomer of octene," as used herein, is an unsaturated hydrocarbon having the molecular formula $C_8H_{16}$, and the unsaturation (the double bond) is not at the alpha position. In other words, the term "isomer of octene" is any octene to the exclusion of 1-octene. Nonlimiting examples of isomers of octene include cis-2-octene, trans-2-octene, cis-3-octene, trans-3-octene, and combinations thereof as well as cis-4-octene, trans-4-octene, branched octene isomers and combinations of thereof.

The term "linear internal octene isomer" as used herein, is a linear and unsaturated hydrocarbon composed of an eight-carbon chain, and the unsaturation (the double bond) is not at the alpha position. Linear internal octene isomers include cis-2-octene, trans-2-octene, cis-3-octene, trans-3-octene, cis-4-octene, trans-4-octene, and combinations thereof. The term "branched $C_8$ olefin" as used herein is an unsaturated hydrocarbon having the molecular formula $C_8H_{16}$, and a main chain length of ≤7 carbon atoms. In contrast to the linear nature of Structure A, branched $C_8$ olefins contain at least one hydrocarbon radical directly bonded to the main chain. Nonlimiting examples of branched $C_8$ olefins include methylheptenes such as 3-methyl-2-heptene, 3-methyl-3-heptene, 5-methyl-2-heptene, 5-methyl-3-heptene, and the like. Additional nonlimiting examples of branched $C_8$ olefins include dimethylhexenes such as 3,4-dimethyl-2-hexene, 3,4-dimethyl-3-hexene, 2,3-dimethyl-3-hexene and the like. Further nonlimiting examples include ethylhexenes, such as 2-ethyl-1-hexene and the like.

An "olefin" is an unsaturated, aliphatic hydrocarbon having a carbon-carbon double bond.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "octene/α-olefin polymer" are indicative of copolymer as described above prepared from polymerizing ethylene or octene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

Test Methods

Gas Chromatography (GC).

The composition of the spent solvent and the hydroformylation reaction product is determined by Gas Chromatography (GC) using the following conditions:

| | |
|---|---|
| Instrument | Agilent Technologies Model 7890 with Flame Ionization Detector |
| Data System | Agilent OpenLab A.02.01 |
| Injector Inlet | 270° C. using 4 mm split/splitless liner with glass wool PN 092002 |
| Column mode: Ramped Pressure | 20 psi (hold for 10 min.) ramp at 0.5 psi/min to 30 psi (hold 1 min.) ramp at 1 psi/min to 50 psi (hold 49 min.) |
| Mode | Split |
| Split Ratio | 150:1 |
| Injection Volume | 1 μL |
| Column | Supelco Petrocol DH 100 m × 0.25 mm i.d. × 0.5 μm |
| Oven Ramp. | 40° C. (Hold 40 min.) Ramp at 10° C./min. to 220° C. (hold 5 minutes) Ramp at 5° C./min. to 260° C. (hold 19 min.) Ramp at 5° C./min. to 270° C. (hold 48 min.) |
| Run Time | 140 minutes |
| Detector | FID set at 270° C. |
| FID Hydrogen Flow | 40 mL/min. |
| FID Air Flow | 400 mL/min. |

-continued

| | |
|---|---|
| Nitrogen (Make-up) gas flow | 20 mL/min. |

Quantitation for the data of Table 1 (in the Examples section below) and Section A of the Examples section is based on weight percent using response factors derived from standard solutions at known concentration.

The compositions of the cross-aldol reaction product and the crude alcohol product are determined by both GC and Gas Chromatography/Mass Spectrometry (GC/MS) using the following conditions:

| | |
|---|---|
| Instrument | Agilent Technologies Model 6890 with Flame Ionization Detector and 5973 MSD |
| Data System | Agilent Enhanced Chemstation D.01.02.16 |
| Injector Inlet | 250° C. using 4 mm split/splitless liner with glass wool PN 092002 |
| Column: | Agilent VF17-MS, 30 m × 0.32 mm × 0.25 μm |
| Column mode: Constant flow | Constant Flow at 2 mL/min |
| Mode | Split |
| Split Ratio | 50:1 |
| Injection Volume | 1 μL |
| Column | Agilent VF-17MS 30 m × 0.32 m × 0.25 um |
| Oven Ramp. | 30° C. (Hold 2.20 min.) Ramp at 10° C./min. to 330° C. (hold 2 minutes) |
| Run Time | 34.20 Minutes |
| Detector | FID set at 250° C. |
| FID Hydrogen Flow | 40 mL/min. |
| FID Air Flow | 450 mL/min. |
| Nitrogen (Make-up) gas flow | 45 mL/min. |
| MSD Source Temp: | 230° C. |
| MSD Quad Temp: | 150° C. |
| MSD Tune: | STune |
| MSD Scan Parameters: | Scan 30-500 m/z |
| Library: | NIST MS Search 2.0f, build Oct. 22, 2009 |

Quantitation for Sections B-E in the Examples section is based on GC area percent from the FID signal (interchangeably referred to as "GC area" or "GC"). Confirmation of peak identities/component structure is based on the Electron Ionization Mass Selective Detector signal matched to the National Institute of Standards and Testing library.

N:I ratio. Hydroformylation reactions of olefins with three or more carbon atoms produce a mixture of both linear and branched isomers. The term "N:I ratio," as used herein, is the ratio of linear or normal (N) aldehyde isomer to the branched or isoaldehyde (I) isomer. The N:I ratio is calculated by dividing the concentration of the normal aldehyde (wt %) by the concentration of the isoaldehyde (wt %). The weight percent concentration of each aldehyde isomer is determined by Gas Chromatography (GC).

DETAILED DESCRIPTION

The present disclosure provides a composition. The composition includes 2-heptylundecanol and a member selected from 2-ethyhexanol and 2-propylheptanol. The composition further includes a mixture of an alcohol (1) and an alcohol (2). Alcohol (1) has the Structure (1):

Structure (1)

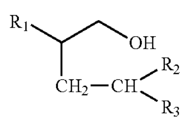

wherein $R_1$ is selected from an ethyl group and a propyl group, $R_2$ and $R_3$ each is independently selected from hydrogen and an alkyl group with the proviso that the total number of carbon atoms in $R_2$ and $R_3$ is 7. Alcohol (2) has the Structure (2):

Structure (2)

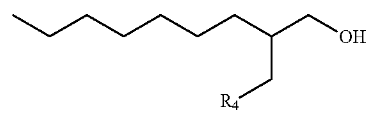

wherein $R_4$ is selected from an n-propyl group, an isopropyl group, an n-butyl group, and an isobutyl group.

In an embodiment, the present composition is a reaction product of, or is otherwise derived from, a purge stream composed of octene isomers. The purge stream is subjected to a series of chemical reactions, namely a hydroformylation reaction, a cross-aldol condensation reaction, and hydrogenation to produce the present composition.

The purge stream includes octene isomers. A "purge stream," as used herein, is one of several fractions separated, or otherwise recovered, from the effluent that exits a polymerization reactor after a polymerization reaction has occurred. The liquid effluent exiting the polymerization reactor contains solid (granular) polymer product, which is removed. A recycle stream is also removed from the effluent which is further processed and returned to the polymerization reactor. The purge stream is the stream that remains (i) after the polymer product has been recovered from the effluent and (ii) after the recycle stream has been separated from the effluent. The purge stream contains unreacted olefin monomer(s), including octene isomers, and other hydrocarbons utilized during the polymerization reaction. It is understood that the purge stream contains no, or substantially no, solid polymer product therein.

In an embodiment, the purge stream is effluent from a polymerization reactor in which ethylene is co-polymerized with octene. The purge stream includes unreacted octene isomers and other hydrocarbons.

In an embodiment, the purge stream includes (i) from 20 wt % to 55 wt %, or from 25 wt % to 50 wt % 1-octene, (ii) from 20 wt % to 60 wt % linear internal octene isomers, (iii) from 2 wt % to 8 wt % branched $C_8$ olefins; and (iv) from 5 wt % to 60 wt % hydrocarbon solvent, wherein weight percent is based on total weight of the purge stream. It is understood the components (i)-(iv) amount to 100 weight percent of the purge stream.

In an embodiment, the purge stream is fed into a hydroformylation reactor system. In the hydroformylation reactor system, the hydroformylation reaction bonds a formyl group (—CH=O) and a hydrogen atom to a carbon-carbon double bond of an alkene (i.e., olefin) to produce aldehyde. As the purge stream contains octene isomers, subjecting the purge stream to hydroformylation conditions forms a reaction product composed of nonanals. A "nonanal" is an aldehyde containing nine carbon atoms. The purge stream is a mixture of alkenes (primarily octene isomers) and alkanes, consequently the reaction product from the hydroformylation reaction includes other components in addition to the nonanals. Nonlimiting examples of other components in the hydroformylation reaction product include $C_8$ olefins, $C_7$-$C_9$ alkanes, and combinations thereof.

An aldehyde selected from $C_4$ aldehyde, $C_5$ aldehyde, and combinations thereof (hereafter "$C_4$/$C_5$ aldehyde") is added to the reaction product composed of nonanals (hereafter "nonanal product") to form a mixture, mixture A. Cross-aldol condensation of mixture A forms a cross-aldol product. The cross-aldol product is composed of alcohol, solvent, water, and a component selected from $C_8$ enals, $C_{10}$ enals, $C_{13}$ enals, $C_{14}$ enals, $C_{18}$ enals, and combinations thereof.

In an embodiment, $C_4$ aldehyde is added to the reaction product composed of nonanals (hereafter "nonanal product") to form a mixture, mixture A4. Cross-aldol condensation of mixture A4 forms a cross-aldol product. The cross-aldol product is composed of alcohol, solvent, water, and a component selected from $C_8$ enals, $C_{13}$ enals, $C_{18}$ enals, and combinations thereof.

In an embodiment, $C_5$ aldehyde is added to the reaction product composed of nonanals (hereafter "nonanal product") to form a mixture, mixture A5. Cross-aldol condensation of mixture A5 forms a cross-aldol product. The cross-aldol product is composed of alcohol, solvent, water, and a component selected from $C_{10}$ enals, $C_{14}$ enals, $C_{18}$ enals, and combinations thereof.

The cross-aldol product is hydrogenated. The cross-aldol product includes $C_8$ enals, $C_{10}$ enals, $C_{13}$ enals, $C_{14}$ enals, $C_{18}$ enals, and combinations thereof. Hydrogenation of the cross-aldol product forms a crude alcohol product. The crude alcohol product is composed of $C_8$ alcohols, $C_{10}$ alcohols, $C_{13}$ alcohols, $C_{14}$ alcohols, $C_{18}$ alcohols, an alkane component, other species, and combinations thereof. The term "species," as used herein, is a mixture of alcohols, enals, enols, and aldehydes, wherein each alcohol, enal, enol, and aldehyde in the species has the same number of carbon atoms.

A "$C_8$ species" is a mixture of $C_8$ alcohols, $C_8$ enals, $C_8$ enols, and $C_8$ aldehydes. A "$C_{10}$ species" is a mixture of $C_{10}$ alcohols, $C_{10}$ enals, $C_{10}$ enols and $C_{10}$ aldehydes. A "$C_{13}$ species" is a mixture of $C_{13}$ alcohols, $C_{10}$ enals, $C_{13}$ enols and $C_{13}$ aldehydes. A "$C_{14}$ species" is a mixture of $C_{14}$ alcohols, $C_{14}$ enals, $C_{14}$ enols and $C_{14}$ aldehydes. A "$C_{18}$ species" is a mixture of $C_{18}$ alcohols, $C_{18}$ enals, $C_{18}$ enols and $C_{18}$ aldehydes.

In an embodiment, the cross-aldol product is composed of $C_8$ enals, $C_{13}$ enals, $C_{18}$ enals, and combinations thereof. Hydrogenation of the cross-aldol product forms a crude alcohol product. The crude alcohol product is composed of $C_8$ alcohols, $C_{13}$ alcohols, $C_{18}$ alcohols, an alkane component, other species, and combinations thereof. Separation of the alkane component from the crude alcohol product leaves a bottoms product composed of $C_8$ alcohols, $C_{13}$ alcohols, $C_{18}$ alcohols, and combinations thereof.

In an embodiment, the cross-aldol product is composed of $C_{10}$ enals, $C_{14}$ enals, $C_{18}$ enals, and combinations thereof. Hydrogenation of the cross-aldol product forms a crude alcohol product. The crude alcohol product is composed of $C_{10}$ alcohols, $C_{14}$ alcohols, $C_{18}$ alcohols, an alkane component, other species, and combinations thereof. Separation of the alkane component from the crude alcohol product leaves a bottoms product composed of $C_{10}$ alcohols, $C_{14}$ alcohols, $C_{18}$ alcohols, and combinations thereof.

1. Mixed Alcohol Composition

The present composition includes 2-heptylundecanol and a member selected from 2-ethyhexanol and 2-propylheptanol. The composition further includes a mixture of an alcohol (1) and an alcohol (2). Alcohol (1) has the Structure (1):

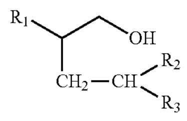

wherein $R_1$ is selected from an ethyl group and a propyl group, $R_2$ and $R_3$ each is independently selected from hydrogen and an alkyl group with the proviso that the total number of carbon atoms in $R_2$ and $R_3$ is 7. Alcohol (2) has the Structure (2):

Structure (2)

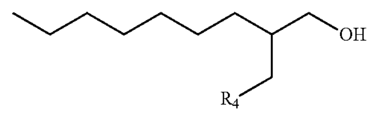

wherein $R_4$ is selected from an n-propyl group, an isopropyl group, an n-butyl group, and an isobutyl group.

In an embodiment, the composition is derived from, or is otherwise obtained from, the bottoms product composed of $C_8$ alcohols, $C_{13}$ alcohols, $C_{18}$ alcohols, and combinations thereof. The composition includes 2-heptylundecanol and 2-ethyhexanol. The composition further includes a mixture of alcohol (1) and alcohol (2). Alcohol (1) has the Structure (1)

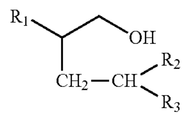

wherein $R_1$ is an ethyl group, and $R_2$ and $R_3$ each is independently selected from hydrogen and an alkyl group with the proviso that the total number of carbon atoms in $R_2$ and $R_3$ is 7. Alcohol (2) has the Structure (2)

Structure (2)

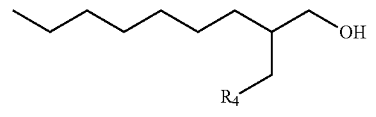

wherein $R_4$ is selected from an n-propyl group, and isopropyl group. In an embodiment, the composition includes from 5 mol % to 40 mol % of the 2-heptylundecanol, from 5 mol % to 40 mol % of the 2-ethyhexanol, from 10 mol % to 40 mol % of alcohol (1) and from 10 mol % to 40 mol % of alcohol (2).

In an embodiment, the composition is derived from, or is otherwise obtained from, the bottoms product composed of $C_{10}$ alcohols, $C_{14}$ alcohols, $C_{18}$ alcohols, and combinations thereof. The composition includes 2-heptylundecanol and 2-propylheptanol. The composition further includes a mixture of alcohol (1) and alcohol (2). Alcohol (1) has the Structure (1)

Structure (1)

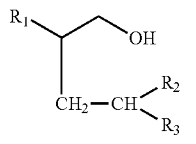

wherein $R_1$ is a propyl group, and $R_2$ and $R_3$ each is independently selected hydrogen and an alkyl group with the proviso that the total number of carbon atoms in $R_2$ and $R_3$ is 7. Alcohol (2) has the Structure (2)

Structure (2)

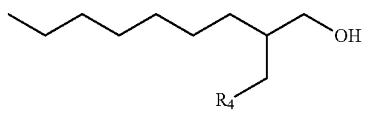

wherein $R_4$ is selected from an n-butyl group and an isobutyl group. In an embodiment, the composition includes from 5 mol % to 40 mol % of the 2-heptylundecanol, from 5 mol % to 40 mol % of the 2-propylheptanol, from 10 mol % to 40 mol % of alcohol (1) and from 10 mol % to 40 mol % of alcohol (2)

2. Surfactant Composition

The present disclosure provides another composition, namely, a surfactant. A "surfactant," as used herein, is a compound containing both a hydrophobic group (tail) and a hydrophilic group (head). Thus, a surfactant is a compound that contains both a water insoluble component and a water soluble component. The composition includes a component having the Structure (3)

Structure (3)

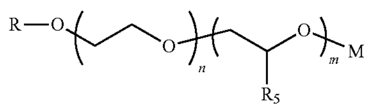

wherein R is selected from a 2-ethylhexyl group, a 2-propylheptyl group, a 2-ethylundecanyl group, a 2-propylundecanyl group, a 2-butylnonanyl group, a 2-pentylnonanyl group, a 2-heptylundecanyl group, and combinations thereof;

$R_5$ is selected from a methyl group and an ethyl group;

M is selected from hydrogen, $SO_3^-$, $PO_3^{-2}$, and a polyglucoside;

m is an integer from 0 to 30; and n is an integer from 0 to 70. The oxide units of the polyglucoside can be in a random structure, or in a block structure. When the oxide units of the polyglucoside are a block structure, the block structure can be in different arrangements.

In an embodiment, the composition with Structure (3) includes R that is the 2-ethylhexyl group. The 2-ethylhexyl group is present in an amount from 5 mol % to 40 mol %.

In an embodiment, the composition with Structure (3) includes R that is the 2-propylheptyl group. The 2-propylheptyl group is present in an amount from 5 mol % to 40 mol %.

In an embodiment, the composition with Structure (3) includes R that is the 2-ethylundecanyl group. The 2-ethylundecanyl group is present in an amount from 5 mol % to 40 mol %.

In an embodiment, the composition with Structure (3) includes R that is the 2-propylundecanyl group. The 2-propylundecanyl group is present in an amount from 5 mol % to 40 mol %.

In an embodiment, the composition with Structure (3) includes R that is the 2-butylnonanyl group. The 2-butylnonanyl group is present in an amount from 5 mol % to 40 mol %.

In an embodiment, the composition with Structure (3) includes R that is the 2-pentylnonanyl group. The 2-pentylnonanyl group is present in an amount from 5 mol % to 40 mol %.

In an embodiment, the composition with Structure (3) includes R that is the 2-heptylundecanyl group. The 2-heptylundecanyl group is present in an amount from 5 mol % to 40 mol %.

In an embodiment, the composition with Structure (3) includes R that is selected from 5 mol % to 40 mol % of the 2-ethylhexyl group, from 10 mol % to 40 mol % of the 2-ethylundecanyl group, from 10 mol % to 40 mol % of the 2-butylnonanyl group, from 5 mol % to 40 mol % of the 2-heptylundecanyl group and combinations thereof;

M is hydrogen;

m is 0; and n is an integer from 1 to 70.

In an embodiment, the composition with Structure (3) includes R that is selected from 5 mol % to 40 mol % of the 2-ethylhexyl group, from 10 mol % to 40 mol % of the 2-ethylundecanyl group, from 10 mol % to 40 mol % of the 2-butylnonanyl group, from 5 mol % to 40 mol % of the 2-heptylundecanyl group and combinations thereof;

M is $SO_3^-$;

m is 0; and n is an integer from 0 to 20.

In an embodiment, the composition with Structure (3) includes R that is selected from 5 mol % to 40 mol % of the 2-propylheptyl group, from 10 mol % to 40 mol % of the 2-propylundecanyl group, from 10 mol % to 40 mol % of the 2-pentylnonanyl group, from 5 mol % to 40 mol % of the 2-heptylundecanyl group and combinations thereof;

M is $SO_3^-$;

m is 0; and n is an integer from 0 to 20.

3. Ethoxylate Composition

The present disclosure provides another composition. In an embodiment, the composition includes an ethoxylate having the Structure (4)

Structure (4)

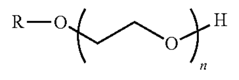

wherein R is selected from a 2-ethylhexyl group, a 2-ethylundecanyl group, a 2-butylnonanyl group, a 2-heptylundecanyl group and combinations thereof;

n is an integer from 1 to 70, or from 3 to 40, or from 3 to 15.

In an embodiment, the composition with Structure (4) includes R that is the 2-ethylhexyl group. The 2-ethylhexyl group is present in an amount from 5 mol % to 40 mol %.

In an embodiment, the composition with Structure (4) includes R that is the 2-ethylundecanyl group. The 2-ethylundecanyl group is present in an amount from 10 mol % to 40 mol %.

In an embodiment, the composition with Structure (4) includes R that is the 2-butylnonanyl group. The 2-butylnonanyl group is present in an amount from 10 mol % to 40 mol %.

In an embodiment, the composition with Structure (4) includes R that is the 2-heptylundecanyl group. The 2-heptylundecanyl group is present in an amount from 5 mol % to 40 mol %.

In an embodiment, the composition includes an ethoxylate having the Structure (4)

Structure (4)

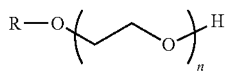

wherein R is selected from the 2-propylheptyl group, the 2-propylundecanyl group, the 2-pentylnonanyl group, the 2-heptylundecanyl group and combinations thereof;

n is an integer from 1 to 70, or from 3 to 40, or from 3 to 15.

In an embodiment, the composition with Structure (4) includes R that is the 2-propylheptyl group. The 2-propylheptyl group is present in an amount from 5 mol % to 40 mol %.

In an embodiment, the composition with Structure (4) includes R that is the 2-propylundecanyl group. The 2-propylundecanyl group is present in an amount from 10 mol % to 40 mol %.

In an embodiment, the composition with Structure (4) includes R that is the 2-pentylnonanyl group. The 2-pentylnonanyl group is present in an amount from 10 mol % to 40 mol %.

In an embodiment, the composition with Structure (4) includes R that is the 2-heptylundecanyl group. The 2-heptylundecanyl group is present in an amount from 5 mol % to 40 mol %.

4. Alkylether Sulfate Composition

The present disclosure provides another composition. In an embodiment, the composition includes an alkylether sulfate or alkylsulfate having the Structure (5)

Structure (5)

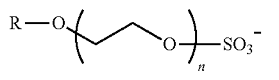

wherein R is selected from a 2-ethylhexyl group, a 2-ethylundecanyl group, a 2-butylnonanyl group, a 2-heptylundecanyl group and combinations thereof;

n is an integer from 0 to 20, or 0, or from 1 to 5, or from 3 to 15.

In an embodiment, the composition with Structure (5) includes R that is the 2-ethylhexyl group. The 2-ethylhexyl group is present in an amount from 5 mol % to 40 mol %.

In an embodiment, the composition with Structure (5) includes R that is the 2-ethylundecanyl group. The 2-ethylundecanyl group is present in an amount from 10 mol % to 40 mol %.

In an embodiment, the composition with Structure (5) includes R that is the 2-butylnonanyl group. The 2-butylnonanyl group is present in an amount from 10 mol % to 40 mol %.

In an embodiment, the composition with Structure (5) includes R that is the 2-heptylundecanyl group. The 2-heptylundecanyl group is present in an amount from 5 mol % to 40 mol %.

In an embodiment, the composition includes

Structure (5)

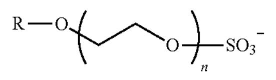

wherein R is selected from a 2-propylheptyl group, a 2-propylundecanyl group, a 2-pentylnonanyl group, a 2-heptylundecanyl group and combinations thereof; and n is an integer from 0 to 20, or 0, or from 1 to 5, or from 3 to 15.

In an embodiment, the composition with Structure (5) includes R that is the 2-propylheptyl group. The 2-propylheptyl group is present in an amount from 5 mol % to 40 mol %.

In an embodiment, the composition with Structure (5) includes R that is the 2-propylundecanyl group. The 2-propylundecanyl group is present in an amount from 10 mol % to 40 mol %.

In an embodiment, the composition with Structure (5) includes R that is the 2-pentylnonanyl group. The 2-pentylnonanyl group is present in an amount from 10 mol % to 40 mol %.

In an embodiment, the composition with Structure (5) includes R that is the 2-heptylundecanyl group. The 2-heptylundecanyl group is present in an amount from 5 mol % to 40 mol %.

By way of example, and not limitation, some embodiments of the present disclosure will now be described in detail in the following Examples.

EXAMPLES

The composition of purge stream recovered from an ethylene/octene polymerization production process is provided in Table 1 below. Weight percent is based on total weight of the purge stream.

TABLE 1

| Purge stream | (wt %) |
|---|---|
| hydrocarbon solvent | 6.1 |
| branched $C_9$ olefins | 4.8 |
| 1-octene | 42.4 |
| trans-4-octene | 2.4 |
| trans-3-octene and cis-4-octene (co-elution) | 9.9 |
| cis-3-octene | 2.0 |
| octane | 0.6 |
| trans-2-octene | 17.0 |
| cis-2-octene | 14.8 |

The ligand for the hydroformylation catalyst used in the inventive examples (IE) is provided in Table 2 below.

TABLE 2

| Ligand A for hydroformylation catalyst |
| --- |
| 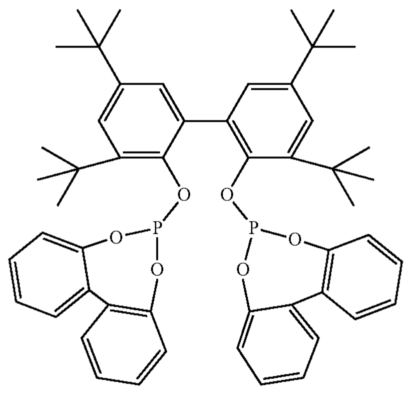 [SMILES: CC(C)(C)c1cc(-c2cc(C(C)(C)C)cc(C(C)(C)C)c2Op2oc3ccccc3c3ccccc3o2)c(Op2oc3ccccc3c3ccccc3o2)c(C(C)(C)C)c1] |
| 6,6'-[[3,3',5,5'-tetrakis(l, 1-dimethylethyl)-[1,1'-biphenyl]-2, 2'-diyl]bis(oxy)]bis-dibenzo[d,f][1,3,2]-dioxaphosphepin |

A. Subjecting Purge Stream to Hydroformylation Conditions

Hydroformylation conditions are provided in a reactor system as shown in FIG. 1. The reactor system consists of three 1-liter stainless steel stirred tank reactors (Rx 1, Rx 2, Rx 3) connected in series. Each reactor is equipped with a vertically mounted agitator and a circular tubular sparger near the bottom for feeding the olefin and/or syngas to the reactor. The sparger contains a plurality of holes of sufficient size to provide the desired gas flow into the liquid body. Each reactor has a silicone oil shell as a way to control reactor temperature. Reactors 1 to 2 and reactors 2 to 3 are further connected via lines to transfer any unreacted gases and to allow a portion of the liquid solution containing aldehyde product and catalyst to flow (e.g., via pressure differential or by pumping) from reactor 1 to reactor 2 and from reactor 2 to reactor 3. Hence, the unreacted olefin of reactor 1 is further hydroformylated in reactor 2 and subsequently in reactor 3. In an alternate configuration, Reactor 3 (Rx 3) may be bypassed, such that only two reactors are employed.

Each reactor also contains a pneumatic liquid level controller for maintaining the desired liquid levels in the reactors. Reactor 1 further contains a line for introducing olefin, carbon monoxide and hydrogen through the sparger while makeup carbon monoxide and hydrogen are passed to reactors 2 and 3 via a transfer line that also carries the unreacted gases from reactor 1 to reactor 2 and from reactor 2 to reactor 3. Each reactor also includes a blow-off vent for controlled removal of unreacted gases if desired. A portion of the liquid reaction solution is continuously pumped from the final reactor in series to a vaporizer, which consists of a heated zone wherein a stream of flowing gas (strip gas) is utilized to sweep a portion of the volatile components to a water-cooled condenser where they can be collected as a liquid in a product receiver (crude product). The non-volatiles are passed through an aqueous extraction zone which consists of a contacting region and a separation zone. The purpose of the aqueous extraction is to extract acidic byproducts, thereby preventing additional hydrolysis of the phosphite ligands, as described in U.S. Pat. No. 5,741,944. Following the aqueous extraction, the organic non-volatiles are pumped through a recycle line back into reactor 1.

A purge stream is introduced into Reactor 1 ("olefin" in FIG. 1 represents the purge stream). The purge stream is from an ethylene-octene polymerization production process. The composition of the purge stream is provided in Table 1, above.

The hydroformylation reaction (i.e., the subjection of the purge stream to hydroformylation conditions) is conducted using two Reactors (Rx 1 and Rx 2 with Rx 3 being bypassed). Two-liters of catalyst solution composed of rhodium dicarbonyl acetylacetonate (394 ppm rhodium), ligand A (Table 2 above) (0.7 wt. %; 2.0 mole equivalents ligand A per mole rhodium), tetraethylene glycol dimethyl ether (about 15% by weight) and mixed $C_4$ aldehyde (about 85% by weight:n-butyraldehyde to iso-butyraldehyde ratio of about 30:1 based on total weight $C_4$ aldehyde) is charged to the reactor system shown in FIG. 1. The reactors are then heated to 70° C. under flowing syn gas ($H_2$:CO ratio=1:1). Reactor 1 and reactor 2 pressures are maintained at 244 psig and 220 psig respectively. The spent solvent is fed to Reactor 1 at a rate of 138 grams per hour. The vaporizer system is operated with a strip gas composed of 1:1 syn gas at a flow rate of 790 sLph; the vaporizer pressure is maintained at 7 psig with a catalyst temperature of 101° C.

After several days of continuous operation, the butyraldehydes and tetraethylene glycol dimethyl ether are removed overhead leaving a reactor process fluid composed of nonanals, aldehyde heavies (byproducts of in situ aldol condensation), unreacted olefins and hydrocarbon solvent (continually introduced as part of the spent solvent). The reaction product composed of nonanals (nonanals reaction product) is collected at a rate of 155 grams/hour. The composition of the purge stream hydroformylation reaction product (interchangeably referred to as "nonanals product") is shown in Table 3 below.

TABLE 3

Table 3. Composition of nonanals product. Weight percent in Table 3 is based on total weight of the nonanals product.

| nonanals product | wt. % |
| --- | --- |
| $C_9$ aldehydes | 64.8 |
| unreacted $C_8$ olefins | 32.8 |
| hydrocarbon solvent | 2.4 |
| N:I ratio of the nonanals reaction product | 13.8:1 (93.2% n-nonanal |

B. Cross-Aldol Condensation

A solution of isopropanol (IPA: 37.5 g), water (4.7 g) and NaOH (1.2 g) is charged to a 300 mL Parr reactor, purged with nitrogen three times, and sealed. The solution is heated to 60° C. with vigorous stirring. A mixture of (i) $C_4$ aldehydes (25.2 g; 0.35 mol) and (ii) nonanals product (Table 3 above) (38.2 g; 0.175 mol n-nonanal) is introduced to the Parr reactor with a small lab pump at a feed rate of 40 mL/min. After addition, the temperature is maintained at 60° C. with stirring for 1 hour, completing the cross-aldol condensation reaction and forming a cross-aldol product composed of $C_8$ enals, $C_{13}$ enals, $C_{18}$ enals, and other species. The cross-aldol product is then cooled to 40° C. and quenched with 0.9 equivalents of acetic acid.

The cross-aldol product is transferred to a separatory funnel and allowed to separate for 30 minutes. A small aqueous phase (bottom phase) is removed. The cross-aldol condensation reaction (described in the paragraph above) is repeated three times and the combined organic phases (320.5 g) are concentrated on a rotary evaporator at 50° C. and 146 mbar. The residue (208 g) is washed with water (104 g) leaving an organic phase with a water content of 3.58 wt. %.

Additional IPA (60 g) is added to the organic phase to facilitate azeotropic removal of water. The mixture is concentrated on a rotary evaporator a second time at 50° C. and 146 mbar to yield cross-aldol product (187.8 g); the composition of the cross-aldol product is shown in Table 4 below.

TABLE 4

Composition of cross-aldol product.

| GC Area % | | | |
|---|---|---|---|
| $C_8$ | $C_{13}$ | $C_{18}$ | water (ppm) |
| 30.5 | 51.8 | 17.7 | 550 |

Conversions of the $C_4$ aldehyde and crude $C_9$ aldehyde product are 97.2 and 93.5% respectively.

C. Hydrogenation of Cross-Aldol Product (Continuous)

The hydrogenation reaction is conducted in a tube reactor including an 8-inch piece of ⅜" stainless steel tubing packed with 8 ml of Ni-3288 that was activated with hydrogen. Ni-3288 is a hydrogenation fixed bed catalyst composed of 60 wt % nickel containing trilobe extrudate, available from BASF. The cross-aldol product (from Table 4) is mixed with hydrogen and is pumped through the Ni-3288 catalyst bed as a hydrogen-saturated liquid phase. The hydrogenation reaction is conducted at 140° C. and 500 psig, with a liquid hourly space velocity (LHSV) of 2.2 $hr^{-1}$ and gas hourly space velocity (GHSV) of 600 $hr^{-1}$ to produce the mixed alcohol/alkane product. The crude mixed alcohol/alkane product is collected in a chilled catch pot. The feed and mixed alcohol/alkane product compositions are shown in Table 5 below.

TABLE 5

Table 5. Cross aldol product (feed) and crude alcohol product from continuous hydrogenation. The data in Table 5 shows effective single-pass conversion of the aldehydes to alcohols in a continuous hydrogenation process.

| Component | Feed to hydrogenation Cross-aldol product (GC area %) | Crude alcohol product (GC area %) |
|---|---|---|
| Isopropanol | 2.69 | 3.01 |
| $C_4$ aldehyde | 1.50 | 0.32 |
| Octenes | 4.87 | 0.00 |
| Octanes | 0.00 | 4.37 |
| $C_8$ enal | 24.95 | 0.00 |
| 2-ethylhexanol | 0.00 | 27.28 |
| $C_9$ aldehyde | 3.03 | 1.28 |
| $C_{13}$ enal | 15.82 | 1.01 |
| $C_{13}$ alcohol | 0.00 | 16.00 |
| $C_{13}$ enal | 20.67 | 1.53 |
| $C_{13}$ alcohol | 0.00 | 20.38 |
| $C_{18}$ enal | 6.76 | 0.66 |
| $C_{18}$ alcohol | 0.68 | 7.32 |
| Total unknowns | 19.03 | 16.85 |

D. Separation of $C_8$-$C_{18}$ Alcohol Mixture

The crude alcohol product from Table 5 (700 g) is loaded into a 1-L round bottom distillation kettle fitted with a heating mantle and connected to a spinning band distillation column. A magnetic stir bar is used to achieve good mixing and even boiling. To remove the Lights fraction (wherein "Lights" interchangeably refers to $C_1$-$C_7$ species) from the mixed alcohol/alkane product, the column pressure is set to 100 mmHg and a reflux ratio of 8:1 is established. The temperature of liquid in the kettle ranges from 59.7° C. (onset of distillation) to 154.9° C. (Lights cut complete); the overhead vapor temperature ranges from 34.4° C. to 56.4° C. during this same time period. A Lights fraction (78.2 g) is collected as the overhead distillate leaving a $C_8$-$C_{18}$ alcohol mixture (621.0 g) as a bottoms product. The compositions of the Lights fraction and the $C_8$-$C_{18}$ alcohol mixture are shown in Table 6 below.

TABLE 6

Composition of Lights Fraction and Bottom Mixture

| Component | Lights Fraction (area %) | Bottom Mixture (area %) |
|---|---|---|
| Isopropanol | 17.09 | 0.00 |
| mixed alkanes | 11.25 | 0.00 |
| Octane | 53.35 | 0.00 |
| $C_8$ Aldehyde | 1.39 | 0.16 |
| 2EH | 12.05 | 26.16 |
| $C_{13}$ Alcohol | 0.00 | 18.83 |
| $C_{13}$ Alcohol | 0.00 | 22.66 |
| $C_{18}$ Alcohol | 0.00 | 11.20 |
| Total unknowns | 4.82 | 19.67 |

E. Ethoxylation of 2EH, $C_8$ $C_{13}$, $C_{18}$ from Mixed Alcohol/Alkane Product Ethoxylation reactions were performed in a jacketed, baffled 9 L stainless steel (SS) autoclave reactor equipped with magnetically driven impeller. Prior to each feed, ethylene oxide was charged to a designated feed (DF) tank positioned on a weigh cell. Ethoxylene oxide (EO) was transferred from the DF tank to the reactor through a flow meter at the reaction temperature of 130° C. Potassium hydroxide (85%) in solid pellet form was utilized as catalyst followed by a dehydration step until the water level as measured by Karl Fisher titration was less than 1000 ppm.

A mixed $C_8$-$C_{18}$ alcohol from bottom mixture in Table 6 (above) (209.2 g) in which 2-ethylhexanol, 2-ethylundecanol, 2-butylnonanol, and 2-heptylundecanol were in the ratio of approximately 2.4/2.1/1.7/1 (according to the integrated peak areas in gas chromatogram spectrum), and potassium hydroxide pellets (1.24 g, 85% minimum purity) were charged into a previously nitrogen purged 9 L reactor. The mixture was heated at 100° C. with agitation and nitrogen sparging. The reactor was pressurized then vented seven times to remove atmospheric oxygen, then pressurized with nitrogen to 16-20 psia at ambient temperature. The catalyzed dehydrated alcohols was heated with agitation to 130° C., then ethylene oxide (325.6 g total) was metered into the reactor over approximately 4 hr at 130° C. After the EO feed was complete, the reactor contents were agitated at reaction temperature for an additional 2 hr to consume unreacted oxide (digest), then cooled to 60° C. A portion of the reactor contents (50 grams) was removed for neutralization by acetic acid for cloud point measurement. The cloud point (measured in 1 wt % aqueous solution) was lower than 25° C. The reactor was heated back with agitation to 130° C. Ethylene oxide (93.0 g total) was metered into the reactor over approximately 4 hr at 130° C. After the EO feed was complete, the reactor contents were agitated at reaction temperature for an additional 2 hr to consume unreacted oxide (digest), then cooled to 60° C. The reaction is neutralized by adding 1.14 g of acetic acid to get the final ethoxylated surfactant product. The cloud point (in 1 wt % aqueous solution) was measured as 82° C.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:

2-heptylundecanol;

a member selected from the group consisting of 2-ethylhexanol and 2-propylheptanol; and a mixture of an alcohol (1) and an alcohol (2)

alcohol (1) having the Structure (1)

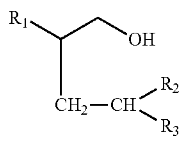

wherein $R_1$ is selected from the group consisting of an ethyl group and a propyl group, $R_2$ and $R_3$ each independently is selected from the group consisting of hydrogen and an alkyl group, with the proviso that the total number of carbon atoms of $R_1$ and $R_2$ is 7, and alcohol (2) having the Structure (2)

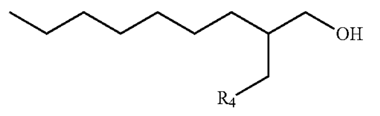

wherein $R_4$ is selected from the group consisting of an n-propyl group, an isopropyl group, an n-butyl group, and an isobutyl group.

2. The composition of claim 1 comprising from 5 mol % to 40 mol % 2-heptylundecanol;

from 5 mol % to 40 mol % 2-ethylhexanol;

from 10 mol % to 40 mol % alcohol (1) having the Structure (1)

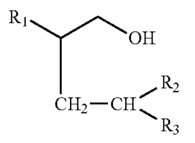

wherein $R_1$ is an ethyl group, $R_2$ and $R_3$ each is independently selected from the group consisting of hydrogen and an alkyl group with the proviso that the total number of carbon atoms in $R_2$ and $R_3$ is 7; and from 10 mol % to 40 mol % alcohol (2) having the Structure (2)

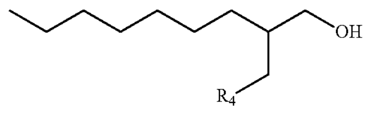

wherein $R_4$ is selected from the group consisting of an n-propyl group and isopropyl group.

3. The composition of claim 1 comprising:

from 5 mol % to 40 mol % 2-heptylundecanol;

from 5 mol % to 40 mol % 2-propylheptanol; and from 10 mol % to 40 mol % alcohol (1)

having the Structure (1)

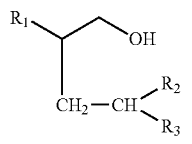

wherein $R_1$ is a propyl group, $R_2$ and $R_3$ each is independently selected from the group consisting of hydrogen and an alkyl group with the proviso that the total number of carbon atoms in $R_2$ and $R_3$ is 7; and from 10 mol % to 40 mol % alcohol (2) having the Structure (2)

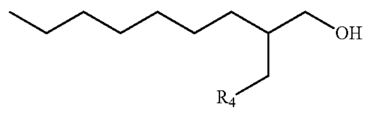

wherein $R_4$ is selected from the group consisting of an n-butyl group and an isobutyl group.

* * * * *